US008425995B2

(12) United States Patent
Shook

(10) Patent No.: US 8,425,995 B2
(45) Date of Patent: Apr. 23, 2013

(54) DISPOSABLE YARD DEBRIS BUNDLING DEVICE WITH DRAWSTRINGS

(76) Inventor: Stuart Shook, Coral Springs, FL (US)

( * ) Notice: Subject to any disclaimer, the term of this patent is extended or adjusted under 35 U.S.C. 154(b) by 797 days.

(21) Appl. No.: 12/406,994

(22) Filed: Mar. 19, 2009

(65) Prior Publication Data

US 2010/0239827 A1 Sep. 23, 2010

(51) Int. Cl.

| | |
|---|---|
| ***B32B 1/04*** | (2006.01) |
| ***B32B 23/02*** | (2006.01) |
| ***B65D 30/00*** | (2006.01) |
| ***A45F 5/00*** | (2006.01) |
| ***B65B 49/00*** | (2006.01) |

(52) U.S. Cl.
USPC ............ 428/35.2; 428/192; 53/461; 294/152; 383/4

(58) Field of Classification Search ................. 428/35.2, 428/99, 192; 53/461; 56/1; 294/152; 383/4
See application file for complete search history.

(56) References Cited

U.S. PATENT DOCUMENTS

| | | | | |
|---|---|---|---|---|
| 5,069,554 | A * | 12/1991 | Bonnett | 383/4 |
| 5,834,582 | A * | 11/1998 | Sinclair et al. | 528/354 |
| 2007/0184239 | A1* | 8/2007 | Mallory | 428/99 |
| 2009/0173460 | A1* | 7/2009 | Handwerker | 160/351 |
| 2010/0008601 | A1* | 1/2010 | Prudencio | 383/4 |

* cited by examiner

*Primary Examiner* — Erik Kashnikow

(74) *Attorney, Agent, or Firm* — Malin Haley DiMaggio & Bowen, P.A.

(57) ABSTRACT

A high strength disposable debris bundling device including a sheet-like main body having a plurality of drawstrings running generally parallel and in spaced relation through separate channels associated with the wrap. The drawstrings preferably comprise elongate flexible thin rope or cord-like structures that run through hem channels formed in the wrap and function to compact and secure the debris in bundle with the wrap disposed in surrounding relation therewith. Providing at least 4 drawstrings allows the wrap to be pulled tightly around the debris and secured in contoured surrounding relation therewith. The wrap preferably has a length of approximately 4.0 feet so as to conform to modern trash removal standards and regulations. Handles are provided to assist in handling the wrapped debris bundle.

6 Claims, 6 Drawing Sheets

DISPOSABLE YARD DEBRIS BUNDLING DEVICE WITH DRAWSTRINGS

CROSS REFERENCE TO RELATED APPLICATIONS

N/A

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction of the patent document or patent disclosure as it appears in the Patent and Trademark Office patent file or records, but otherwise reserves all copyright rights whatsoever.

BACKGROUND OF THE INVENTION

1. Field of the Invention

The present invention relates generally to devices for lawn debris and trash collection and disposal, and more particularly to a disposable plastic debris wrap having a plurality of drawstrings for securing lawn debris and trash in an easy to handle bundled configuration.

2. Description of Related Art

Yard debris, such as leaves and tree trimings, is typically collected and placed in plastic trash bags for removal and disposal. Trash bags are typically fabricated from lightweight plastic and may include an opening adapted with a drawstring that provides a means for closing the bag. There are, however, a number of disadvantages present with the use of conventional trash bags. One primary disadvantage with the use of conventional trash bags relates to size. More particularly, yard debris often includes long branches or limbs that simply will not fit within the confines of a conventional trash bag. As a result the user must spend additional time and energy cutting the limbs and branches down to a suitable size. Another disadvantage relates to placing the debris into conventional trash bags. The use of conventional trash bags for disposal of yard debris requires that the debris be gathered, lifted, and placed in the bag. Conventional trash bags are typically held with one hand and filled with the other, or may be temporarily placed in a garbage barrel and filled.

As a result of such difficulties, people often forego the use of conventional trash bags and simply bundle branches and limbs using twine or cord. Furthermore, a growing number of cities, municipalities, and waste collection companies encourage bundling of yard debris, and many such entities have adopted waste collection rules that require tree trimmings and branches to be bundled prior to collection and disposal. Waste collection rules commonly limit the size of debris bundles to approximately 4.0 feet in length, and about 40.0 pounds in weight.

The background art reveals a number of devices structured to assist in the collection and disposal of tree trimmings, branches, and other lawn and garden debris. For example, U.S. Patent Application Publication No. US 2007/0183690 A1 issued to Schoenig et al., discloses a planar bag material containment system having a flexible layer for collecting lawn debris and the like. The device includes flaps secured about the perimeter of the material, and a zipper for enclosing the contents. The device further includes handles and pull straps placed externally on the material for securing the load. U.S. Patent Application Publication No. US 2007/0184239 A1 issued to Mallory describes an yard waste storage and disposal system which includes a biodegradable web material having a net attached thereto, along with plurality of longitudinal and lateral net lengths which are twisted, knotted, or woven together. The net is made from jute twine, cord, rope or other biodegradable material. The net includes freely extending ties around the outside of the web, and the net apparatus is glued to the web.

U.S. Pat. No. 4,519,183 issued to Parody illustrates trash collecting device having a flexible fabric or plastic sheet material with ties or strings placed about the perimeter, along with side flaps and ties- Opposite sides of the sheet are made rigid by inserting removable sticks or rods through channel members formed along the edges. The channels can be formed doubling over the edges and sealing, through heat application or adhesive. U.S. Pat. No. 5,713,980 issued to Tierney discloses a flexible composting mat for aerating organic material and yard debris, the mat having netting and handles. A pull handle is incorporated around the outside perimeter to tighten the mat and load into a bag-like configuration. The drawstring can be attached through a channel formed in the periphery. U.S. Patent Application Publication No. US 2005/0120692 A1 issued to Kim discloses a leaf collection woven mesh net of biodegradable fiber material. The device includes stake means, along with a continuous pulling strand extending about the outer perimeter of the net.

While the devices disclosed in the background art are generally acceptable for certain applications, there remains a need for further advancements in the art of debris collection and disposal.

BRIEF SUMMARY OF THE INVENTION

The present invention overcomes the limitations and disadvantages present in the art by providing a high strength disposable debris wrap having a plurality of drawstrings running generally parallel and in spaced relation through separate hem channels formed in the wrap. The drawstrings preferably comprise elongate flexible thin rope or cord-like structures that run through hem channels formed in the wrap and function to compact and secure the debris in bundle with the wrap disposed in surrounding relation therewith. Providing at least 4 drawstrings allows the wrap to be pulled tightly around the debris and secured, by tying the drawstrings together, in contoured surrounding relation therewith. The drawstrings further function to provide added strength. The wrap preferably has a width of approximately 4.0 feet so as to conform to most modern trash removal standards and regulations. With the debris secured in a bundle, the tied together drawstrings further function as handles to allow the user to lift and move the wrapped debris bundle.

Accordingly, it is an object of the present invention to provide a high strength disposable plastic wrap for use in bundling debris, such as tree trimmings, branches, limbs, and leaves.

Another object of the present invention is to provide a debris bundling wrap having a plurality of drawstrings traversing the wrap for use in securing the wrap in contoured surrounding relation with the debris.

Still another object of the present invention is to provide a debris bundling wrap incorporating handles for use in lifting and moving the bundle.

In accordance with these and other objects, which will become apparent hereinafter, the instant invention will now be described with particular reference to the accompanying drawings.

DETAILED DESCRIPTION OF THE INVENTION

Figure 1:
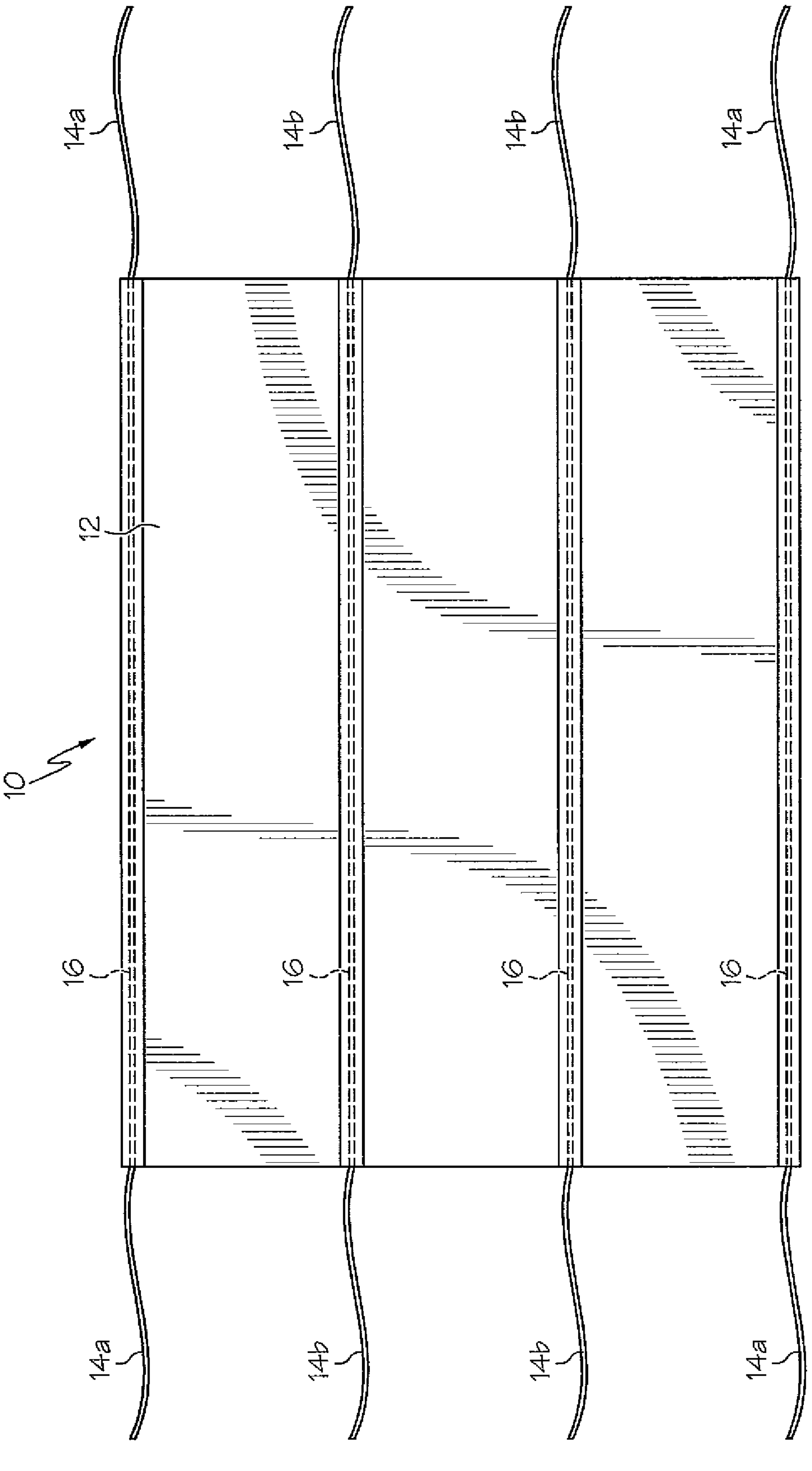
FIG. 1 is a top plan view of a debris bundling wrap in accordance with the present invention.

With reference now to the drawings, FIGS. 1-5 depict a preferred embodiment of a disposable debris wrap, generally referenced as 10, in accordance with the present invention. As best seen in FIGS. 1 and 2A, disposable debris wrap 10 comprises a main body sheet 12 formed of sheet or sheet-like material, preferably a light-weight, high-strength plastic similar or identical to that used in the fabrication of conventional plastic garbage/trash bags. While the preferred embodiment is disclosed as being fabricated from plastic, the present invention contemplates any suitable sheet-like material, including virgin or recycled paper, hessian or burlap, natural or synthetic woven fabric, a suitable polymeric material such as polypropylene, polyethelyne, polyester, or any other suitable material. It is further advantageous that the material used have or be adapted to include areas having, a high coefficient of static friction to facilitate the staking of a plurality of wrapped bundles in a stable pile. The disposable wrap, and particularly sheet 12, preferably has a width of approximately 4 feet so as to conform to modern trash removal standards and regulations when configured as a bundled load.

Wrap 10 further includes a plurality of drawstrings, referenced as 14*a* and 14*b*, that traverse the length of sheet 12 in generally parallel and spaced relation through separate sleeve-like hems or channels 16 formed on sheet 12 and extend beyond the opposing sides of sheet 12 as best illustrated in FIGS. 1 and 2. In a preferred embodiment, each drawstring 14*a* and 14*b* is movably received within sleeve-like channels 16 so as to allow the user to pull the wrap and surrounding relation with the debris load, and secure the wrap by tying together drawstring ends. Drawstrings 14*a* and 14*b* each preferably comprise an elongate flexible, thin rope or cord-like structures. In an alternate embodiment, drawstrings 14*a* and 14*b* may comprise bands of plastic material, or any other suitable material. In an embodiment wherein sheet 12 is fabricated from plastic, channels 16 may be formed by heat welding or sonic welding the edges of strips of material, reference as 16*a* and 16*b*, to sheet 12 as illustrated in FIG. 2D. In an embodiment channels 16 may be formed by adhesively securing the edges of strip material to sheet 12, by stitching, or by any other suitable means of attachment.

Figure 2A:
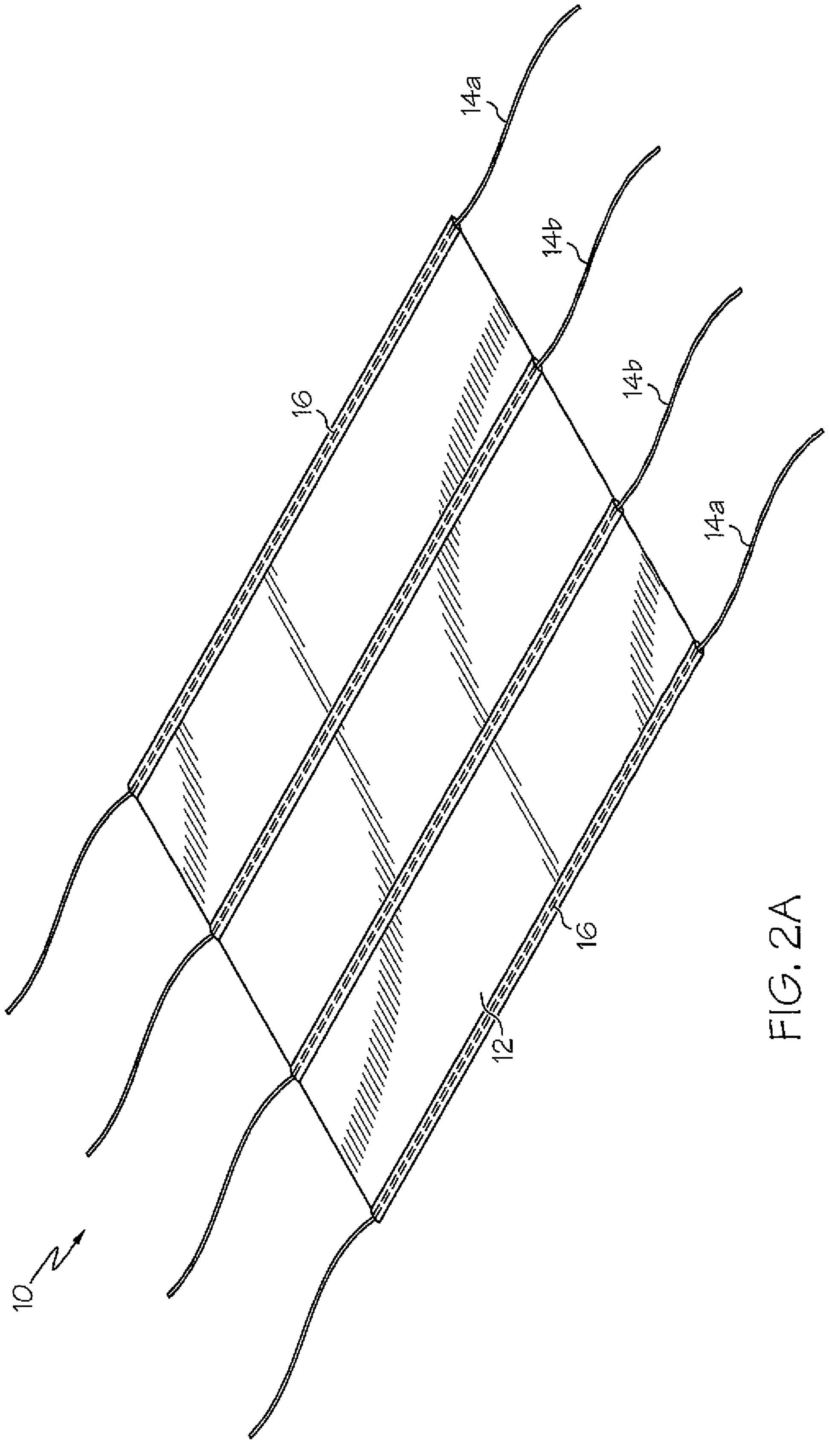
FIG. 2A is a top perspective view thereof.
Figure 2C:
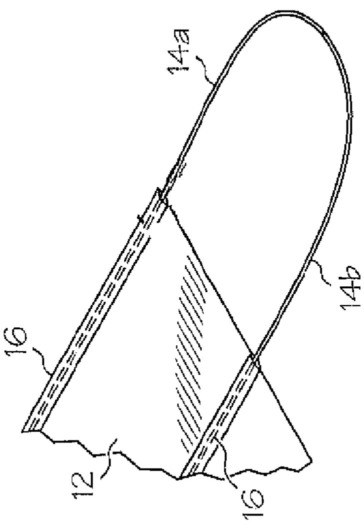
FIG. 2C is a partial detail view of another alternate drawstring configuration.
Figure 2D:
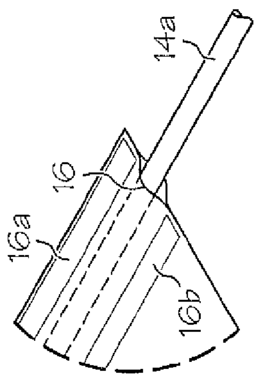
FIG. 2D is a partial detail view of a channel formation.
Figure 2B:
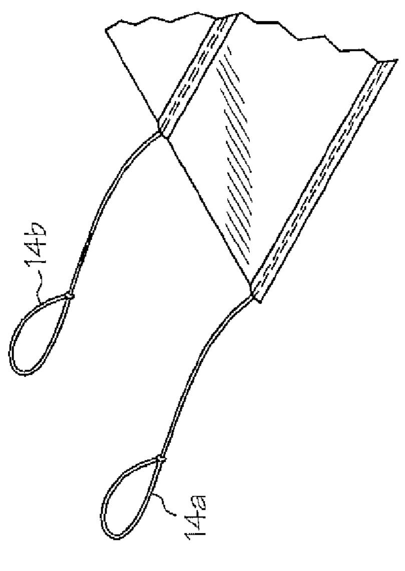
FIG. 2B is a partial detail view of an alternate drawstring configuration.

Wrap 10 is primarily configurable between an open deployed configuration wherein sheet 12 is opened on the ground and a closed bundled configuration wherein sheet 12 is disposed in surrounding relation with the load so as to bundle the load in a generally tubular configuration. A significant aspect of the present invention involves providing a plurality, namely 4, drawstrings in parallel spaced relation so as to allow sheet 12 to compact and conform to the load in the bundled configuration. Pulling on opposing drawstring ends functions to draw opposing ends of sheet 12 together and to compact the load with sheet 12 in contoured surrounding relation therewith. In a preferred embodiment, wrap 10 includes 4 drawstrings, including a pair of outer drawstrings, referenced as 14*a,* disposed at or near opposing peripheral side edges of sheet 12, and inner drawstrings, referenced as 14*b*, disposed in inwardly spaced relation with outer drawstrings 14*a*. Drawstrings 14*a* and 14*b* may include opposing ends each terminating in a loop as illustrated in FIG. 2B to facilitate grasping and bundling. In another contemplated embodiment, adjacent drawstrings 14*a* and 14*b* may be joined at each opposing end as illustrated in FIG. 2C.

Figure 3:
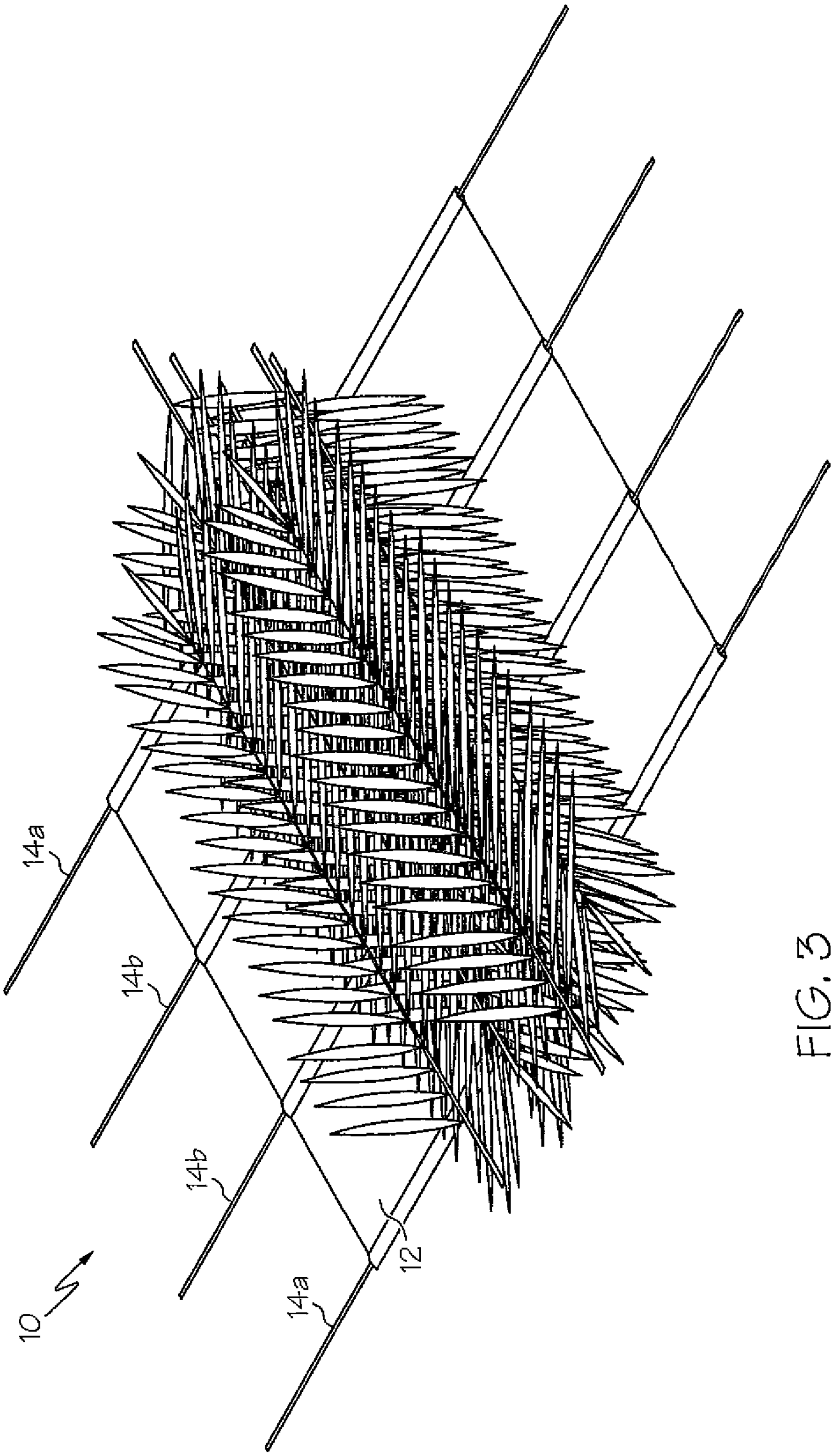
FIG. 3 is a top perspective view illustrating tree trimmings placed on the wrap prior to bundling.
Figure 4:
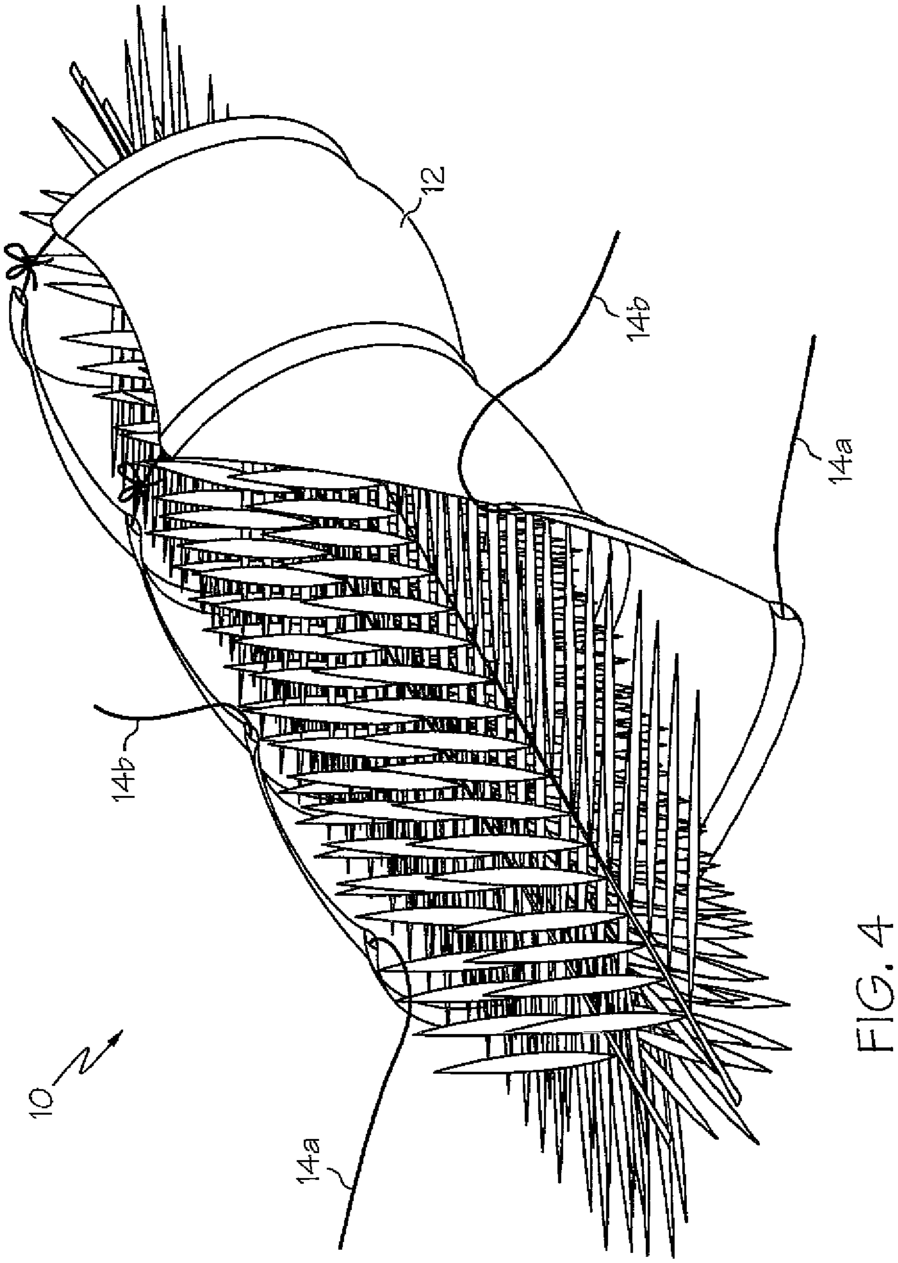
FIG. 4 is a top perspective view illustrating the bundling of the tree trimmings using the drawstrings.
Figure 5:
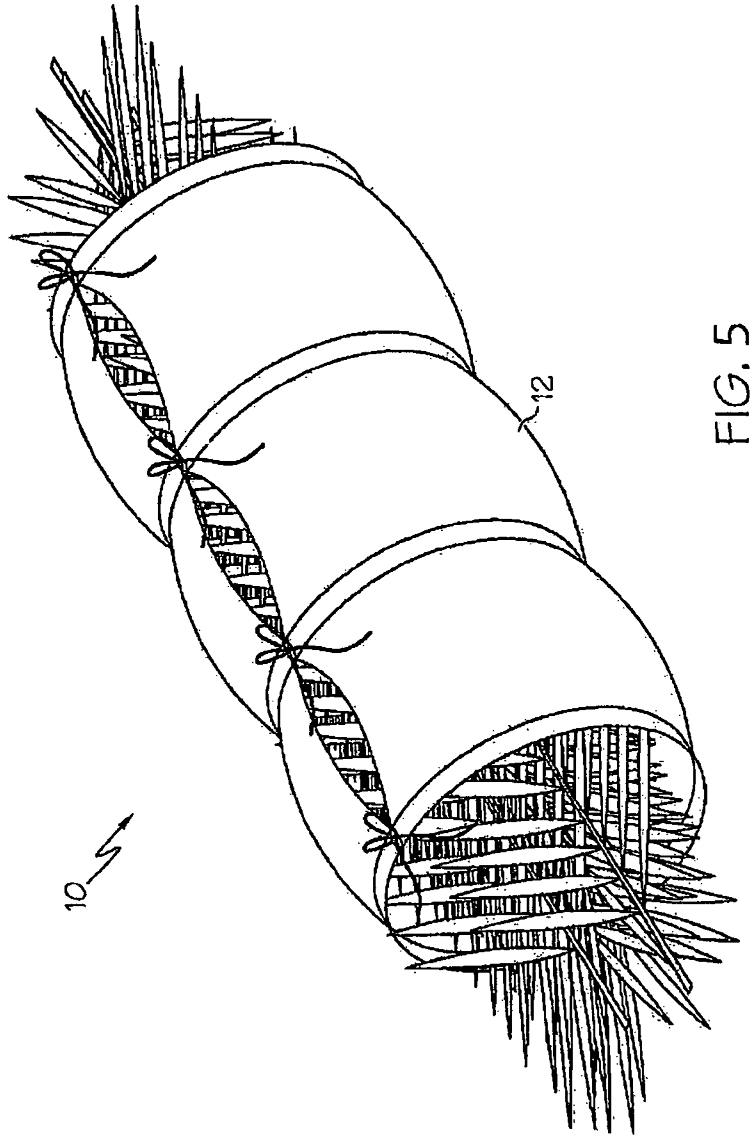
FIG. 5 is a top perspective view illustrating the wrap in contoured surrounding relation with the debris.

Wrap 10 of the present invention is used by (a) laying the main body sheet 12 generally flat on the ground with drawstrings 14 projecting from the opposing ends thereof as illustrated in FIGS. 1 and 2; (b) placing yard debris, such as tree trimmings, branches, and raked leaves on top of main body 12 as illustrated in FIG. 3; (c) pulling opposing drawstring ends together such that sheet 12 wraps around the debris in contoured surrounding relation therewith and securing the drawstring ends tied together as illustrated in FIGS. 4 and 5 to form a bundled load that is approximately 4 feet from end to end thereby conforming to popular trash collection requirements. Once bundled the debris may be lifted, using the tied drawstrings as handles, and placed for eventual collection and removal by trash collection service. Using the tied drawstrings as handles is considered significant as the drawstrings preferably have a higher tensile strength than the material forming sheet 12 and thus form handles of higher overall strength. As noted above, wrap 10 is formed with, or is adapted with, material having a high coefficient of static friction which facilitates stacking of a plurality of wrapped bundles in a stable pile by preventing relative movement between adjacently engaged bundles. Wrap 10 is preferably positioned in proximity to the work area and manually loaded with debris, such as tree trimmings, branches, leaves etc., in any suitable manner. In addition, wrap 10 may be positioned under a tree such that trimmings fall directly onto the openly deployed sheet 12.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A disposable yard debris bundling device comprising:

a rectangular disposable sheet-like main body having a width and a length, said length being equal to or exceeding said width;

at least four channels each of said channels disposed perpendicular to said width and in parallel spaced relation spanning the length of said main body;

each of said channels having an elongate flexible drawstring partially received therein, in slidable relation therewith, with opposing ends projecting therefrom;

said sheet-like main body configurable between an open deployed configuration wherein said main body is openly disposed for receiving debris, and a closed bundled configuration wherein said main body is disposed in surrounding relation with the debris so as to bundle the debris in a generally tubular open-ended configuration, and wherein said tubular configuration is secured by opposing ends of each of said drawstrings tied together.

2. A disposable yard debris bundling device according to claim 1, wherein said at least four channels are in spaced relation across said width and include a pair of outer channels disposed at or near opposing peripheral side edges of said sheet, and a pair of inner channels disposed in inwardly spaced relation with said outer channels.

3. A disposable yard debris bundling device according to claim 2, wherein one of said drawstrings received within one of said outer channels is connected to one of said drawstrings received within one of said inner channels.

4. A disposable yard debris bundling device according to claim 2, wherein each of said drawstring projecting ends forms a loop.

5. A disposable yard debris bundling device according to claim 1, wherein said sheet-like main body is fabricated from high-strength, light-weight plastic.

6. A disposable yard debris wrap-type bundling device comprising:

a rectangular disposable sheet-like main body having a width and a length equal to or exceeding said width;

said main body defining at least four channels in parallel spaced relation spanning the length thereof;

said channels including a pair of outer channels disposed at or near opposing peripheral side edges of said sheet, and a pair of inner channels disposed in inwardly spaced relation with said outer channels;

at least one elongate flexible drawstring partially movably received within each of said at least four channels with drawstring opposing ends projecting from each of said channels;

said drawstring ends projecting from said outer channels being connected to the the drawstring ends projecting from the adjacent inner channels on each side of said main body;

said sheet-like main body configurable between an open deployed configuration wherein said main body is openly disposed for receiving debris, and a closed bundled configuration wherein said main body is disposed in generally tubular surrounding relation with the debris so as to bundle the debris in a generally tubular configuration.

* * * * *